No. 709,553. Patented Sept. 23, 1902.
W. O. N. MORRISON.
BREAD CUTTER.
(Application filed Apr. 28, 1902.)
(No Model.)

Witnesses:
G. A. Daubenschmidt.
Nellie Bunker.

Inventor:
William O. N. Morrison,
By N. N. Morrow,
Atty.

UNITED STATES PATENT OFFICE.

WILLIAM O. N. MORRISON, OF BELVIDERE, ILLINOIS.

BREAD-CUTTER.

SPECIFICATION forming part of Letters Patent No. 709,553, dated September 23, 1902.

Application filed April 28, 1902. Serial No. 105,020. (No model.)

*To all whom it may concern:*

Be it known that I, WILLIAM O. N. MORRISON, a citizen of the United States of America, residing at Belvidere, in the county of Boone and State of Illinois, have invented certain new and useful Improvements in Bread-Cutters, of which the following is a specification.

My invention relates to the production of a device for cutting bread. Its object is to provide such a device of simple and comparatively inexpensive construction that may be readily adjusted to cut uniform slices of any desired thickness, having a knife-guide adjustable to different thicknesses of blades and that will hold the blade straight across the bread; and it consists of certain new and useful features of construction and combinations of parts hereinafter fully described, and specifically pointed out in the claims.

Figure 1:
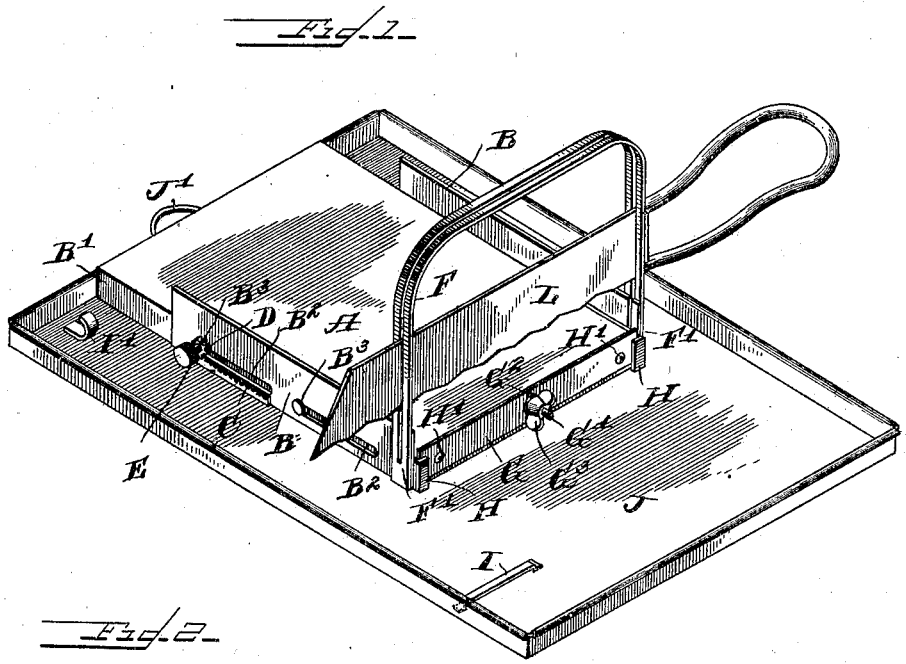
Figure 2:
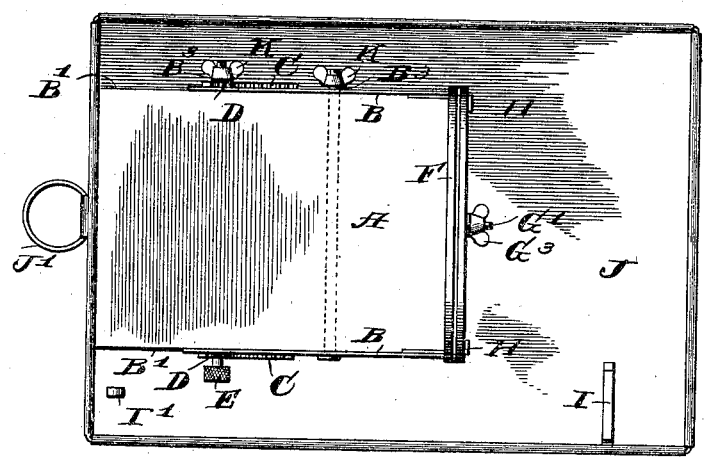
Figure 3:
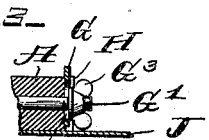

Referring to the accompanying drawings, which form a part of this specification, Figure 1 is a perspective view of a bread-cutter embodying my invention. Fig. 2 is a top plan view of the same. Fig. 3 is a section at the dotted line 3 3 in Fig. 2 of parts there shown.

Like letters of reference indicate corresponding parts throughout the several views.

A is a bread-board.

B represents side pieces projecting above the board A and slidably connected with the edges B' thereof by means of longitudinal slats $B^2$ therein and rods $B^3$, extending transversely therethrough and through such board A.

C represents racks fast to the side pieces B.

D represents pinions fast to one of the rods $B^3$ and meshing with the racks C.

E is a peripherally-roughened disk for rotating the rod $B^3$, to one end whereof it is fast.

F is a knife-guide longitudinally slotted and mounted by its ends F' on the side pieces B.

G is a vertically-slidable end piece connected with the inner end of the board A by means of a threaded bolt G', set into said board A and projecting through a slot $G^2$ therein, and a nut $G^3$.

H represents angular guides fast to the edges B' of the board A and serving to retain the ends of the end piece G in proper position.

H' represents projecting knobs whereby the part G may be raised and lowered.

I I' are a loop and a hook, respectively, secured to the crumb-tray J.

J is a crumb-tray inclosing the board A, to which it is secured.

The parts B and G serve as stops to retain a loaf of bread in position on the board A while slices are being cut therefrom.

The knife-guide F may be moved back and forth lengthwise of the board A within the limits of the length of the slots $B^2$ in the side pieces B by first loosening the nuts K on the rods $B^3$ and then rotating one of said rods by means of the disk E thereon and through the pinions D thereon meshing with the racks C, moving the side pieces B, carrying such knife-guide F back and forth, and thereafter tightening such nuts K. Obviously any desired adjustment of the knife-guide F within the limits of the device may be obtained in the manner above indicated. The knife L may be withdrawn from its guide F when not in use and have the point of the blade thereof inserted through the loop I and its handle engaged by the hook I', the tray J being suspended vertically by means of the ring J' thereon from any fixed support.

What I claim as new, and desire to secure by Letters Patent, is—

1. A bread-cutter, comprising a bread-board, side pieces, projecting above the board and slidably connected with the edges thereof, a longitudinally-slotted knife-guide mounted, by its ends, on the side pieces, substantially as and for the purpose specified.

2. A bread-cutter, comprising a bread-board, side pieces projecting above the board and slidably connected with the edges thereof, a longitudinally-slotted knife-guide mounted, by its ends, on the side pieces, and a vertically-slidable end piece connected with the inner end of the board—said side pieces and end piece serving as stops to retain a loaf of bread in position on the board while slices are being cut therefrom—substantially as and for the purpose specified.

In testimony whereof I have signed my name to this specification in the presence of two subscribing witnesses.

WILLIAM O. N. MORRISON.

Witnesses:
   GEORGE GREENLEE, Jr.,
   G. T. THRUSH.